(12) United States Patent
Sakamoto

(10) Patent No.: US 8,709,326 B2
(45) Date of Patent: Apr. 29, 2014

(54) INJECTION MOLDING METHOD AND INJECTION MOLDING MACHINE

(75) Inventor: Ichiro Sakamoto, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 171 days.

(21) Appl. No.: 13/158,847

(22) Filed: Jun. 13, 2011

(65) Prior Publication Data

US 2011/0304077 A1 Dec. 15, 2011

(30) Foreign Application Priority Data

Jun. 15, 2010 (JP) ................................ 2010-136028

(51) Int. Cl.
*B29C 45/34* (2006.01)
*B29C 45/56* (2006.01)

(52) U.S. Cl.
USPC ......... 264/328.7; 425/150; 425/590; 425/595

(58) Field of Classification Search
USPC .............. 264/40.5, 328.7; 425/150, 589, 595, 425/590
See application file for complete search history.

(56) References Cited

U.S. PATENT DOCUMENTS

| | | | | |
|---|---|---|---|---|
| 4,828,769 | A * | 5/1989 | Maus et al. ................... | 264/1.31 |
| 4,900,242 | A * | 2/1990 | Maus et al. ................... | 425/149 |
| 5,061,168 | A * | 10/1991 | Fox ............................... | 425/190 |
| 5,500,166 | A | 3/1996 | Sasaki et al. | |
| 5,772,932 | A * | 6/1998 | Kamiguchi et al. ......... | 264/40.5 |
| 5,906,777 | A * | 5/1999 | Kamiguchi et al. ......... | 264/40.1 |
| 7,481,642 | B2 * | 1/2009 | Niewels ........................ | 425/135 |
| 7,580,771 | B2 * | 8/2009 | Quail et al. ................... | 700/197 |
| 2004/0081717 | A1 * | 4/2004 | Marazita ....................... | 425/150 |
| 2004/0212121 | A1 * | 10/2004 | Doi et al. ...................... | 264/102 |
| 2006/0198974 | A1 * | 9/2006 | Miller ........................... | 428/35.7 |
| 2008/0265466 | A1 * | 10/2008 | Clarke .......................... | 264/328.1 |
| 2012/0183639 | A1 * | 7/2012 | Yankov et al. ................ | 425/525 |

FOREIGN PATENT DOCUMENTS

| | | |
|---|---|---|
| CN | 1726120 A | 1/2006 |
| CN | 201325148 Y | 10/2009 |
| JP | 3-199023 A | 8/1991 |
| JP | 2001-47483 A | 2/2001 |
| WO | 2004/037513 A1 | 5/2004 |

OTHER PUBLICATIONS

European Search Report application No. EP11004895 dated Sep. 7, 2011.
Chinese Office Action application No. 201110161078.8 dated Jun. 3, 2013.

* cited by examiner

*Primary Examiner* — Jill Heitbrink
(74) *Attorney, Agent, or Firm* — Squire Sanders (US) LLP

(57) ABSTRACT

An injection molding machine may include a split mold where a gas discharge portion is formed at parting surfaces. Further, the cross-section of a flow passage of the gas discharge portion may be reduced at a predetermined timing after the start of the filling of a molding material. Since the cross-section of the flow passage of the gas discharge portion is reduced after a cavity space starts being filled with a molding material, it may be possible to make the amount of gas, which flows through the gas discharge portion, large until the cross-section of the flow passage of the gas discharge portion is reduced. It may be possible to prevent a foreign material from adhering to the inner peripheral surface of the gas discharge portion.

6 Claims, 5 Drawing Sheets

INJECTION MOLDING METHOD AND INJECTION MOLDING MACHINE

RELATED APPLICATION

This application is based upon and claims the benefit of priority from Japanese Patent Application No. 2010-136028, filed on Jun. 15, 2010, the entire contents of which are incorporated herein by reference.

BACKGROUND

1. Technical Field

The present invention relates to an injection molding method and an injection molding machine.

2. Description of Related Art

In the past, in a stretch blow molding method that forms a container made of a resin, for example, a PET resin, a container has been formed as a finished product, that is, a finished molded product formed by forming a preform (a parison with a bottom) in advance as a preliminarily molded product, that is, a preliminary molding by an injection molding machine, setting the preform in a stretch blow molding machine, mechanically stretching the preform in an axial direction while the preform is heated and softened, and stretching the preform in a radial direction by air blowing.

Meanwhile, for example, in the case of a container that can be sealed by a screw type cap, a screw portion is formed at a spout of the container. However, the screw portion requires sufficiently high strength. For this reason, the screw portion is formed at the preform stage so as to have the same dimensions and shape as the screw portion of the container that is the finished product.

In the injection molding machine that forms a preform, like in a general injection molding machine, a resin heated and melted in a heating cylinder is filled in a cavity space of a mold device and is cooled and solidified in the cavity space, so that a preform is formed.

The injection molding machine includes the mold device, a mold clamping device, and injection device. The injection device includes the heating cylinder, an injection nozzle that is mounted on the front end of the heating cylinder and injects the melted resin, a screw that is disposed in the heating cylinder so as to be rotatable and able to freely advance and retreat, and the like. Further, the mold device includes a stationary mold and a movable mold. The movable mold is made to advance and retreat by the mold clamping device, so that the mold of the mold device is opened and closed, that is, mold closing, mold clamping, and mold opening. As the mold is clamped, a cavity space is formed between the stationary mold and the movable mold.

Further, when the screw is rotated in a metering process, the melted resin is collected on the front of the screw. Accordingly, the screw retreats, and the mold of the mold device is closed and clamped while the screw retreats. Subsequently, the screw is made to advance in the injection process, so that the resin collected on the front side of the screw is injected from the injection nozzle and is filled in the cavity space through a runner such as a hot runner formed at the mold device. Next, the resin in the cavity space is cooled and solidified in a cooling process, so that a preform is formed. Subsequently, the mold is opened and the preform is taken out.

Meanwhile, the resin is melted in the heating cylinder, and generates gas while being heated in the hot runner. Further, if the generated gas remains in the cavity space, sinks are formed on the surface of the preform or bubbles are formed in the preform. In particular, if sinks are formed on the surface of the screw portion of the preform or bubbles are formed in the screw portion, a sealing property between a cap and the screw portion of a finished container deteriorates. For this reason, it is not possible to seal the container by the cap.

Accordingly, in the mold device in the related art, a gas vent is formed at the parting lines between the stationary mold and the movable mold by a groove having a small depth, so that gas in the cavity space is discharged to the outside of the mold device through the gas vent (for example, see Patent Literature 1).

CITATION LIST

Patent Literature

[PTL 1] JP-A-7-285135

SUMMARY

According to an embodiment of the invention, there is provided an injection molding method of an injection molding machine including reducing a cross-section of a flow passage of a gas discharge portion formed at parting surfaces at a predetermined timing after a start of a filling of a molding material.

DETAILED DESCRIPTION in the mold device in the related art, an ingredient contained in the gas, for example, an oligomer (low-molecular resin) adheres to the inner peripheral surface of the gas vent as a foreign material when the gas passes through the gas vent. For this reason, the gas vent is clogged in a short time. Accordingly, since the mold device needs to be cleaned at regular intervals and adhering oligomer needs to be removed, not only the maintenance of the mold device is troublesome but also the productivity of a preform deteriorates.

There is a need for providing an injection molding method that can suppress the clogging of a gas vent, simplify the maintenance of a mold device, and improve the productivity of a molded product.

An injection molding method according to an embodiment of the invention is applied to an injection molding machine including a split mold where a gas discharge portion is formed at parting surfaces.

Further, the cross-section of a flow passage of the gas discharge portion is reduced at a predetermined timing after the start of the filling of a molding material.

According to an embodiment of the invention, the injection molding method is applied to an injection molding machine including a split mold where a gas discharge portion is formed at parting surfaces.

Further, the cross-section of a flow passage of the gas discharge portion is reduced at a predetermined timing after the start of the filling of a molding material.

In this case, since the cross-section of the flow passage of the gas discharge portion is reduced after a cavity space starts being filled with a molding material, it may be possible to make the amount of gas, which flows through the gas discharge portion, large while the cross-section of the flow passage is reduced after the start of the filling of a molding material. Accordingly, it may be possible to suppress the adhesion of a foreign material to the inner peripheral surface of the gas discharge portion and to suppress the clogging of the gas discharge portion.

As a result, since the mold device does not need to be cleaned at regular intervals and adhering materials do not need to be removed, it may be possible not only to simplify the maintenance of the mold device but also to improve the productivity of a molded product.

Embodiments of the invention will be described in detail below with reference to the drawings. In this case, an injection molding machine, which is used to form a preform as a preliminary molded product, will be described.

Figure 1:
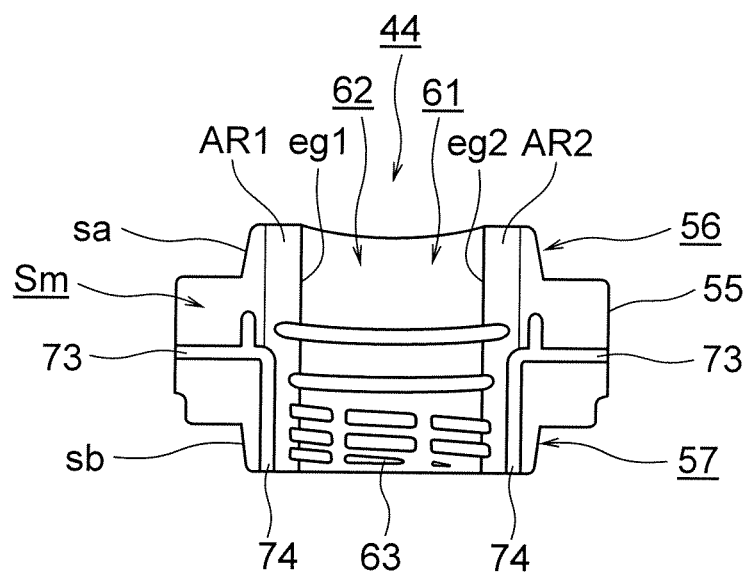
FIG. 1 is a view showing a split slide block of an embodiment of the invention.
Figure 2:
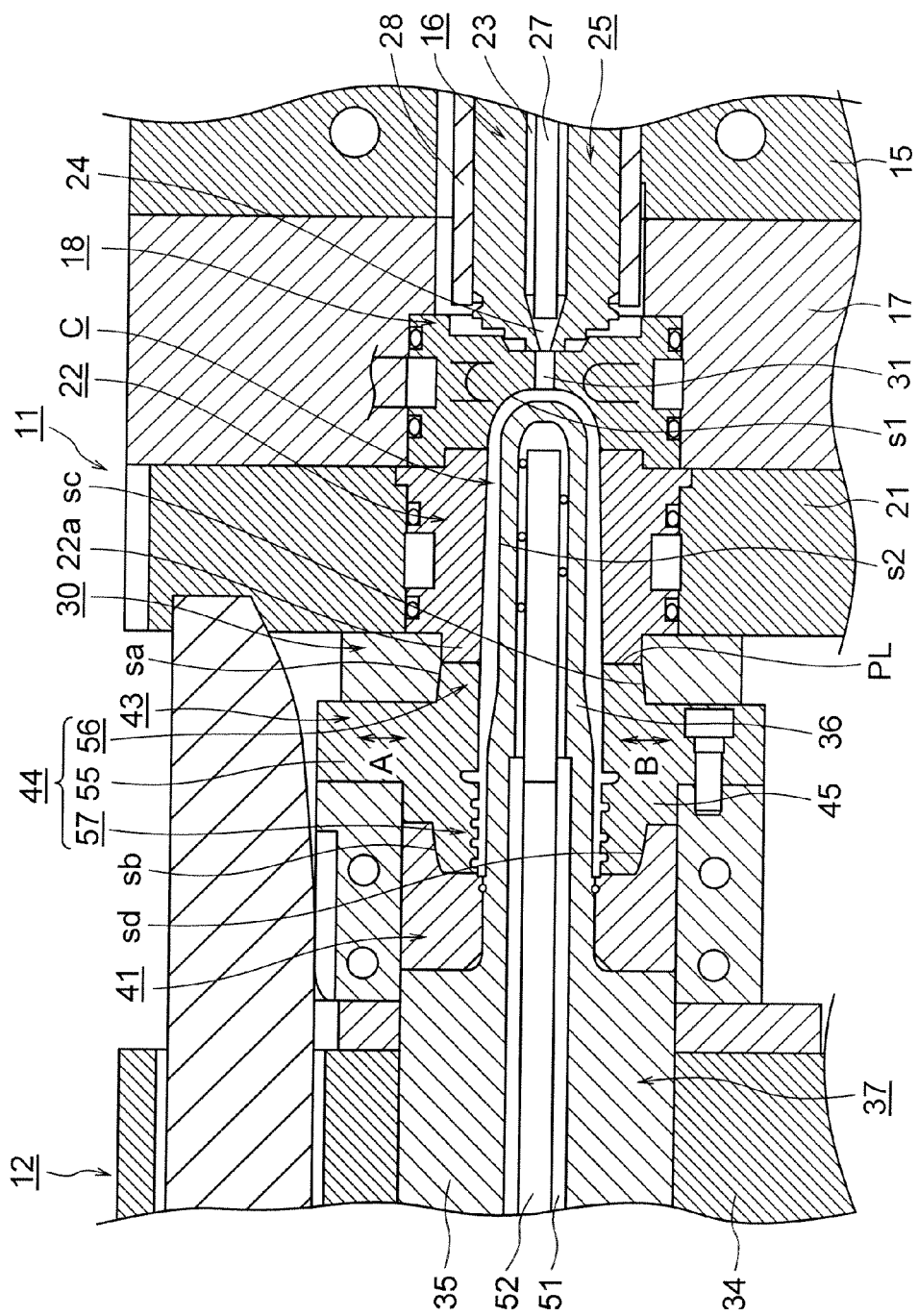
FIG. 2 is a sectional view of a mold device according to an embodiment of the invention.
Figure 3:
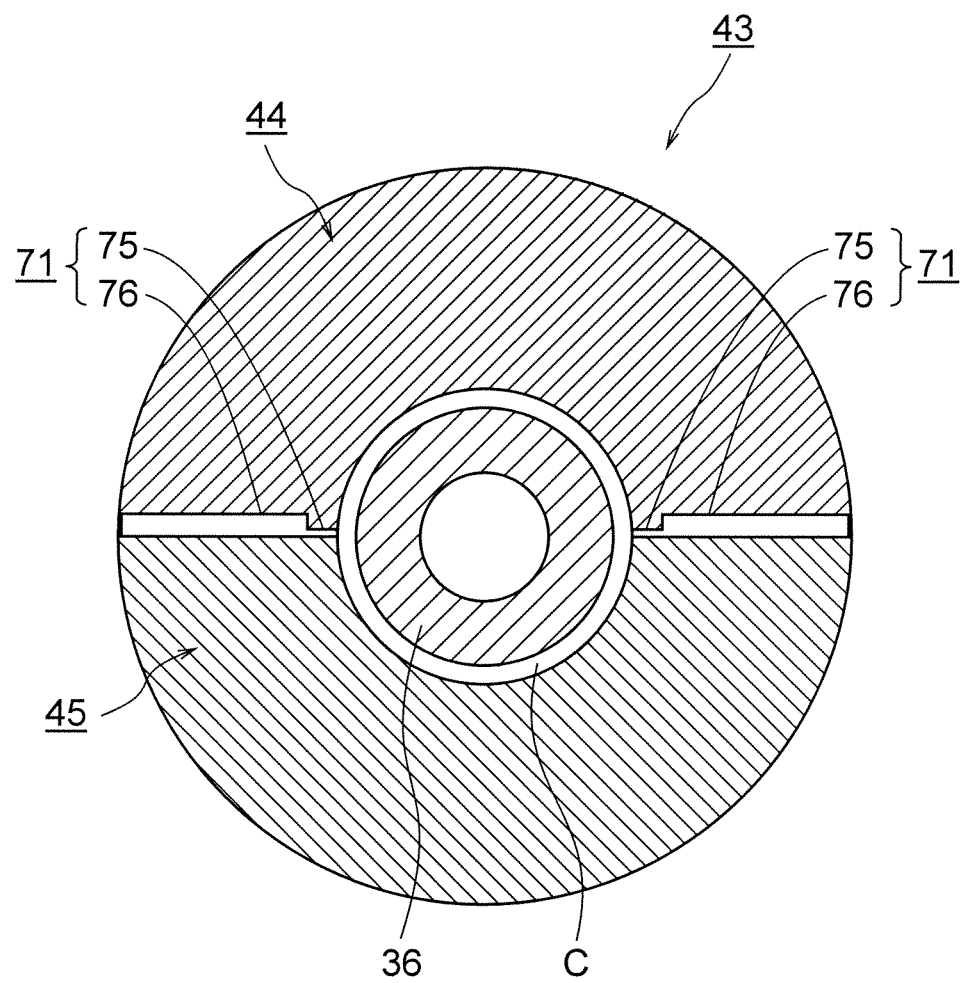
FIG. 3 is a cross-sectional view of main parts of the mold device according to an embodiment of the invention.

FIG. 1 is a view showing a split slide block of an embodiment of the invention, FIG. 2 is a sectional view of a mold device according to an embodiment of the invention, and FIG. 3 is a cross-sectional view of main parts of the mold device according to the embodiment of the invention.

In FIGS. 1 to 3, reference numeral 11 denotes a stationary mold as a first mold, and reference numeral 12 denotes a movable mold as a second mold that is disposed so as to freely advance and retreat relative to the stationary mold 11. The stationary mold 11 and the movable mold 12 form a mold device.

Further, the stationary mold 11 is mounted on a stationary platen (not shown) and the movable mold 12 is mounted on a movable platen (not shown). As the movable platen is made to advance and retreat by a toggle mechanism (not shown) as a mold clamping force generating unit, the movable mold 12 is made to advance and retreat so that the mold of the mold device is closed, clamped, and opened. A cavity space C having a shape corresponding to the preform is formed by the stationary mold 11 and the movable mold 12 during the mold clamping. Meanwhile, reference character PL denotes parting lines that form mating faces between the stationary mold 11 and the movable mold 12, that is, parting surfaces. Furthermore, the stationary platen, the movable platen, and the toggle mechanism form a mold clamping device. The mold clamping device includes a mold clamping motor as a drive unit that clamps a mold, and can make the movable platen advance and retreat by operating the toggle mechanism through the drive of the mold clamping motor. Moreover, a mold clamping cylinder may be used instead of the toggle mechanism and the mold clamping motor.

Meanwhile, in the description of the invention, as seen from the stationary mold 11, a direction approaching the movable mold 12 corresponds to the front side and a direction separated from the movable mold 12 corresponds to the rear side. Further, as seen from the movable mold 12, a direction approaching the stationary mold 11 corresponds to the front side and a direction separated from the stationary mold 11 corresponds to the rear side.

The stationary mold 11 includes a manifold (not shown), a spacer plate 15, a nozzle unit 16 that is supported by the spacer plate 15, a mold plate 17 that is mounted on the front side of the spacer plate 15, a bottom cavity 18 as a first cavity that is supported by the mold plate 17 and is disposed by coming onto contact with the front end of the nozzle unit 16, a cavity plate 21 that is mounted on the front side of the mold plate 17, a side cavity (simply referred to as a "cavity") 22 as a second cavity that is supported by the cavity plate 21 and is disposed by coming onto contact with the front end of the bottom cavity 18, and an annular locking ring 30 as a first fastening member that is mounted on the front side of the cavity plate 21 and the side cavity 22, and the like. Meanwhile, for the purpose of the positioning and alignment of the locking ring 30 relative to the side cavity 22, an annular projection 22a is formed at the front end of the side cavity 22 and the projection 22a is fitted to a hole of the locking ring 30.

The stationary platen is disposed on the rear side of the manifold, and an injection device (not shown) is disposed on the rear side of the stationary platen. The injection device includes a heating cylinder as a cylinder member, and a screw as an injection member that is disposed in the heating cylinder so as to be rotatable and freely advance and retreat. In order to rotate the screw or make the screw advance, the injection device further includes a metering motor as a metering drive unit, an injection motor as an injection drive unit, and the like. Furthermore, in a metering process, it may be possible to collect a resin as a molding material on the front side of the screw in the heating cylinder by rotating the screw through the drive of the metering motor. In an injection process, it may be possible to inject the collected resin from an injection nozzle, which is mounted on the front end of the heating cylinder, by making the screw advance through the drive of the injection motor, and to fill the cavity space C with the resin.

Moreover, the nozzle unit 16 includes a nozzle 25, a needle 27 as a valve element, a heater 28 as a heating element, and the like. The nozzle 25 includes a columnar through hole 23, and a nozzle opening 24 is formed at the front end of the nozzle so as to communicate with the through hole 23. The needle 27 as a valve element is disposed in the through hole 23 so as to freely advance and retreat, opens the nozzle opening 24 when retreating, and closes the nozzle opening 24 when advancing. The heater 28 as a heating element is disposed on the outer peripheral surface of the through hole 23, and heats a resin so that the melted resin is maintained. Further, the resin passes through a hot runner (not shown) formed at the manifold, and is sent to the through hole 23.

Further, the bottom cavity 18 includes a concave surface s1 that is formed at the front end of the bottom cavity so as to have a shape corresponding to the bottom of a preform, and a gate 31 that communicates with the nozzle opening 24 of the nozzle unit 16 and is opened to the concave surface s1. The gate 31 functions as a supply port through which the resin sent from the through hole 23 is supplied to the cavity space C.

Furthermore, the side cavity 22 has a tubular shape and includes a concave surface s2 that has a shape corresponding to the side portion of the preform.

Moreover, the movable mold 12 includes a core seat 34, a cylindrical core 37, an annular locking ring 41 as a second fastening member, a split 43 as a split mold, and the like. The cylindrical core 37 is supported by the core seat 34, and includes a base portion 35 having a large diameter and a tubular core mold 36. The tubular core mold 36 is formed to protrude forward from the base portion 35 and toward the inside of the bottom cavity 18 and the side cavity 22. The annular locking ring 41 as a second fastening member is mounted on the core 37 at a predetermined position, that is, on the front side of the base portion 35 in this embodiment, and is disposed so as to surround the core mold 36. The split 43 as a split mold is disposed so as to surround the core mold 36 and be movable to the front side of the locking ring 41.

A columnar hole 51 is formed in the core 37. A tubular pipe 52 extends in the hole 51 with a predetermined distance between the inner peripheral surface of the hole 51 and itself so that the front end of the cylindrical pipe faces the front end of the core mold 36. Further, water as a cooling medium is supplied into the pipe 52 from a cooling source (not shown). The water passes through a first flow passage formed in the pipe 52, is reversed at the front end of the pipe 52, and passes through a second flow passage that is formed between the inner peripheral surface of the hole 51 and the outer peripheral surface of the pipe 52. While passing through the second flow passage, the water cools the core 37. Then, the water returns to the cooling source.

Further, the split 43 includes slide blocks 44 and 45 as a plurality of (two in this embodiment) mold members that is disposed at a position corresponding to a screw portion of the preform and divided at predetermined positions in a circumferential direction. Each of the slide blocks 44 and 45 has a half-divided structure. A cam (not shown) is operated while interlocking with the opening/closing of the mold of the mold device. With the operation of the cam, the slide blocks 44 and 45 are moved in a radial direction (the directions of arrows A and B of FIG. 2). Each of the slide blocks 44 and 45 includes a flange portion 55 that is formed at the middle portion of the slide block in an axial direction, a hub portion 56 that is formed to protrude forward from the flange portion 55 and has a diameter smaller than the diameter of the flange portion 55, and a hub portion 57 that is formed to protrude rearward from the flange portion 55 and has a diameter smaller than the diameter of the flange portion 55.

The hub portion 56 includes a tapered surface sa that is formed so that an outer diameter is reduced toward the front side. The hub portion 57 includes a tapered surface sb that is formed so that an outer diameter is reduced toward the rear side.

Furthermore, a through hole 61, which forms a screw portion of a preform and a neck portion adjacent to the screw portion, is formed at the slide block 44; a smooth column surface 62 is formed at the front half portion of the through hole 61 (a portion of the through hole corresponding to the side cavity 22); and a screw groove 63, which forms a screw portion of the preform, is formed at the rear half portion of the through hole 61 (a portion of the through hole corresponding to the locking ring 41).

Meanwhile, when the mold is opened so that the movable mold 12 is separated from the stationary mold 11, the slide blocks 44 and 45 are disposed at retreat positions that are positioned at the outer side in the radial direction. When the mold is closed so that the movable mold 12 comes into contact with the stationary mold 11, the slide blocks 44 and 45 are disposed at operation positions that are positioned at the inner side in the radial direction. Accordingly, the slide blocks 44 and 45 form the cavity space C together with the bottom cavity 18, the side cavity 22, the locking ring 41, and the like.

Further, a hole having a shape corresponding to the hub portion 56 is formed at the front end portion of the locking ring 30, and a tapered surface sc corresponding to the tapered surface sa is formed on the inner peripheral surface of the hole so that the inner diameter of the tapered surface sc is increased toward the front side. Furthermore, a concave portion having a shape corresponding to the hub portion 57 is formed at the front end portion of the locking ring 41, and a tapered surface sd corresponding to the tapered surface sb is formed on the inner peripheral surface of the concave portion so that the inner diameter of the concave portion is increased toward the front side.

In the mold device having the above-mentioned structure, when the mold clamping device makes the movable mold 12 advance by making the movable platen advance so as to close the mold, the slide blocks 44 and 45 disposed at retreat positions are moved inward in the radial direction with the operation of the cam, are disposed at the operation positions, and come into contact with each other. Subsequently, the split 43 (the slide blocks 44 and 45) and the side cavity 22 come into contact with each other. Accordingly, a cavity space C is formed between the stationary mold 11 and the movable mold 12, that is, between the core 37 and the bottom cavity 18 of the movable mold 12 and the side cavity 22 of the stationary mold 11.

Subsequently, when the mold clamping device generates a mold clamping force and clamps the mold, the movable mold 12 is pressed against the stationary mold 11 by the mold clamping force. Accordingly, a resin injected by the injection device is filled in the cavity space C through the hot runner, the through hole 23, and the gate 31.

In this case, the hub portion 56 enters the hole of the locking ring 30 through the sliding between the tapered surface sa and the tapered surface sc, and the hub portion 57 enters the concave portion of the locking ring 41 through the sliding between the tapered surface sb and the tapered surface sd. Accordingly, the slide blocks 44 and 45 come into close contact with each other at mating faces. Therefore, the resin, which is filed in the cavity space C, does not leak from a gap between the slide blocks 44 and 45.

Further, when the resin filled in the cavity space C is cooled and solidified, the mold clamping device makes the movable platen retreat and opens the mold. Accordingly, the slide blocks 44 and 45 are moved outward in the radial direction with the operation of the cam, and are disposed at the retreat positions.

Meanwhile, as the cavity space C is filled with the resin, air in the cavity space C needs to be discharged to the outside of the mold device. Further, the resin is melted in the heating cylinder, and generates gas while being heated in the hot runner. Furthermore, if air and the generated gas remain in the cavity space C after the cavity space C is filled with the resin, sinks are formed on the surface of the preform or bubbles are formed in the preform. In particular, if sinks are formed on the surface of the screw portion of the preform or bubbles are formed in the screw portion, a sealing property between a cap and the screw portion of a container as a finished product deteriorates. For this reason, it is not possible to seal the container by the cap.

Accordingly, in this embodiment, a gas vent 71 as a gas discharge portion is formed between the slide blocks 44 and 45 of the split 43 and air and gas in the cavity space C are discharged to the outside of the mold device through the gas vent 71.

For this reason, concave portions AR1 and AR2, which have a predetermined shape, that is, a rectangular shape in this embodiment, having a small depth from edges eg1 and eg2 of the inner peripheral surface to the outside in the radial direction, are formed at a predetermined position, that is, near the inner peripheral surface of the through hole 61 in this embodiment, on one of the respective mating faces of the slide blocks 44 and 45, that is, a mating face Sm of the slide block 44 in this embodiment. Further, first grooves 73, which are deeper than the concave portions AR1 and AR2, are formed from the respective concave portions AR1 and AR2 to the outside in the radial direction, and second grooves 74, which are deeper than the concave portions AR1 and AR2, are formed from the respective concave portions AR1 and AR2 toward the front end of the slide block 44.

Accordingly, when the slide blocks 44 and 45 come into contact with each other at the mating faces, a first gas vent passage 75 is formed by the concave portions AR1 and AR2, a second gas vent passage 76 is formed by the first groove 73, and a third gas vent passage (not shown) is formed by the second groove 74. Therefore, as the cavity space C is filled with the resin, it may be possible to discharge air and gas in the cavity space C to the outside of the mold device through the first gas vent passage 75, the second gas vent passage 76, and the third gas vent passage.

As a result, it may be possible to prevent sinks from being formed on the surface of a preform or to prevent bubbles from being formed in a preform. In particular, since it may be possible to prevent sinks from being formed on the surface of a preform or to prevent bubbles from being formed in a preform, it may be possible to improve a sealing property between a cap and the screw portion of the container and to sufficiently seal the container by a cap.

Meanwhile, if an ingredient contained in the gas, for example, an oligomer adheres to the inner peripheral surface of the gas vent 71, the gas vent 71 is clogged in a short time. Accordingly, making the gas vent 71 large can be considered. However, if the gas vent 71 is large, the resin leaks to the parting surfaces from the gas vent 71, that is, flash are formed when the cavity space is completely filled with the resin.

Accordingly, in this embodiment, the slide blocks 44 and 45 come into contact with each other at the mating faces with a small force for a predetermined time after the start of the closing of the mold of the mold device, and a gap between the slide blocks 44 and 45 and the cross-section of the flow passage of the gas vent 71 are large.

Figure 4:
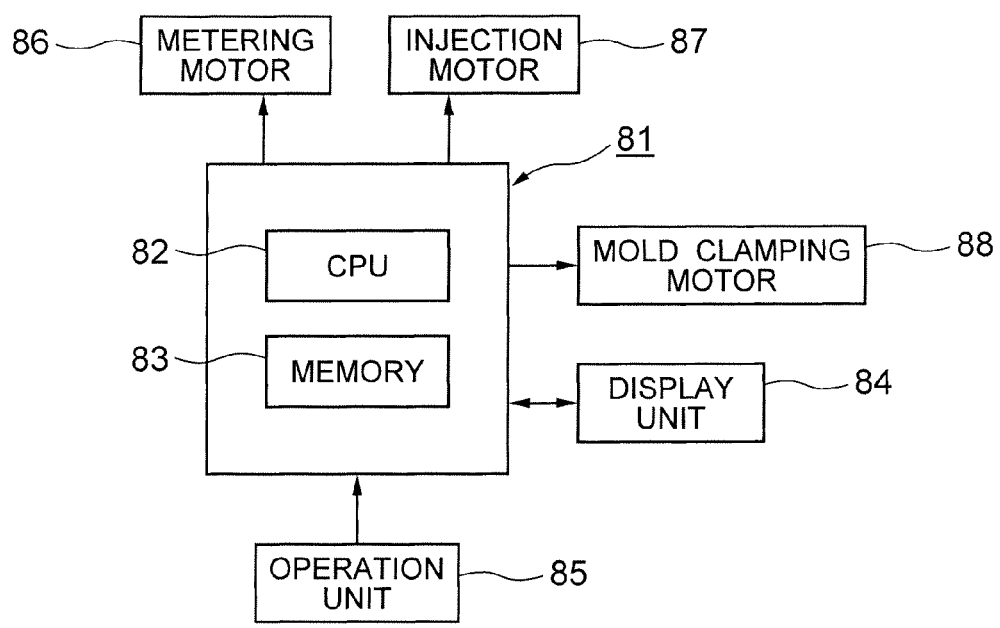
FIG. 4 is a control block diagram of an injection molding machine according to an embodiment of the invention.
Figure 5:
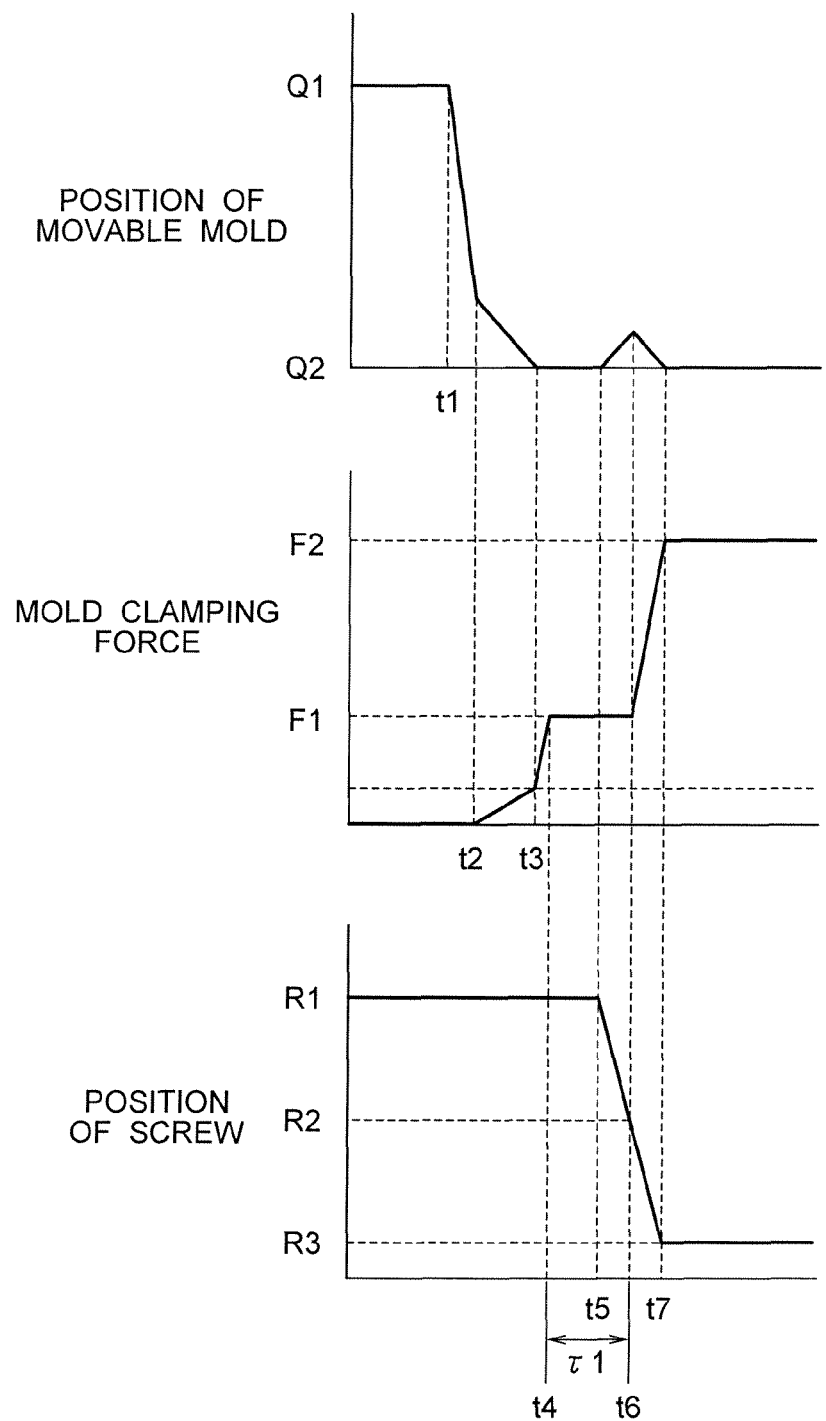
FIG. 5 is a time chart illustrating the operation of the injection molding machine according to an embodiment of the invention.

FIG. 4 is a control block diagram of the injection molding machine according to the embodiment of the invention, and FIG. 5 is a time chart illustrating the operation of the injection molding machine according to the embodiment of the invention.

In FIG. 4, reference numeral 81 denotes a controller, and the controller 81 includes a CPU 82 as an arithmetic device and a memory 83 as a recording unit and a storage unit. Further, reference numeral 84 denotes a display unit, reference numeral 85 denotes an operation unit, reference numeral 86 denotes the metering motor, reference numeral 87 denotes the injection motor, and reference numeral 88 denotes the mold clamping motor.

In the injection molding machine having the above-mentioned structure, first, the movable mold 12 is disposed at a mold opening position Q1 and the screw is disposed at a metering completion position R1. Moreover, at a timing t1, mold opening/closing processing means (mold opening/closing processing unit) (not shown) of the CPU 82 performs mold opening/closing processing, drives the mold clamping motor 88, starts closing the mold, and makes the movable mold 12 advance.

After that, when the movable mold 12 comes into contact with the stationary mold 11 at a timing t2, a mold clamping force is gradually increased. Since it is known that a foreign material is not present between the stationary mold 11 and the movable mold 12 when the movable mold 12 reaches a mold protecting position (a position set to confirm whether a foreign material is present between the stationary mold 11 and the movable mold 12) at a timing t3, the mold opening/closing processing means increases a mold clamping force.

Subsequently, at a timing t4, the mold opening/closing processing means starts clamping the mold with a first mold clamping force F1.

In this case, the first mold clamping force F1 is set so that the slide blocks 44 and 45 come into contact with each other at the mating faces with a small force and a gap between the slide blocks 44 and 45 and the cross-section of the flow passage of the gas vent 71 are large. Meanwhile, in this case, the mold opening/closing processing means functions as flow passage cross-section setting processing means (a flow passage cross-section setting processing unit).

Further, at a predetermined timing t5 after the timing t4, an injection processing means (injection processing unit) (not shown) of the CPU 82 performs injection processing, starts making the screw, which is positioned at the metering completion position R1, advance, and starts filling the cavity space C with a resin.

Furthermore, when the screw reaches a pressure-rise screw position R2, which is positioned on the front side of an advance limit position R3, at a timing t6, the processing means increases a mold clamping force and sets the mold clamping force to a second mold clamping force (set mold clamping force) F2.

Meanwhile, the mold opening/closing processing means can increase a mold clamping force at the timing t6 where a predetermined time τ1 has passed from the timing t4, and can set the mold clamping force to a second mold clamping force (set mold clamping force) F2.

In this case, until the screw reaches a pressure-rise screw position R2, the movable mold 12 retreats due to the pressure of a resin. However, since the resin filled in the cavity space C does not reach the gas vent 71, the resin does not leak to the outside of the mold device through the gas vent 71.

In this case, the second mold clamping force F2 is set so that the slide blocks 44 and 45 come into contact with each other at the mating faces with a large force and a gap between the slide blocks 44 and 45 (a gap between the parting lines PL) and the cross-section of the flow passage of the gas vent 71 are reduced. Meanwhile, in this case, the mold opening/closing processing means functions as flow passage cross-section changing processing means (a flow passage cross-section changing processing unit).

After that, the screw reaches the advance limit position R3 at a timing t7.

Since the first mold clamping force F1 is generated between the timing t4 and the timing t6 in this embodiment as described above, the hub portion 56 does not completely enter the hole of the locking ring 30, the hub portion 57 does not completely enter the concave portion of the locking ring 41, and the gap between the slide blocks 44 and 45 and the cross-section of the flow passage of the gas vent 71 are large. Accordingly, since it may be possible to make the amount of gas, which flows through the gas vent 71, large, it may be possible to prevent an oligomer from adhering to the inner peripheral surface of the gas vent 71 and to suppress the clogging of the gas vent 71.

As a result, since cleaning does not need to be frequently performed for the removal of the adhering oligomer, it may be possible not only to simplify the maintenance of the mold device but also to improve the preform productivity.

Meanwhile, the invention is not limited to the above-mentioned embodiment, and may have various modifications on the basis of the concept of the invention. These modifications are not excluded from the scope of the invention.

The invention claimed is:

1. An injection molding method of an injection molding machine which comprises a split mold divided into a plurality of mold members in a circumferential direction, said method comprising:

reducing a cross-section of a flow passage of a gas discharge portion formed at mating faces of the mold members at a predetermined timing after a start of a filling of a molding material, wherein the mating faces of the mold members are configured to move in a direction perpendicular to a closing direction of the injection molding machine.

2. The injection molding method according to claim 1, wherein the cross-section of the flow passage is reduced by increasing a mold clamping force at the predetermined timing.

3. The injection molding method according to claim 2, wherein the cross-section of the flow passage is reduced by reducing a gap between mating faces of the split mold through the increase of the mold clamping force.

4. An injection molding machine comprising:
a split mold divided into a plurality of mold members in a circumferential direction and where a gas discharge portion is formed at mating faces of the mold members; and
a controller that controls the operation of the split mold,
wherein the controller includes a flow passage cross-section changing processing unit that reduces the cross-section of a flow passage of the gas discharge portion at a predetermined timing after the start of the filling of a molding material, and
wherein the mating faces of the mold members are configured to move in a direction perpendicular to a closing direction of the injection molding machine.

5. The injection molding machine according to claim 4, wherein the flow passage cross-section changing processing unit reduces the cross-section of the flow passage by increasing a mold clamping force at the predetermined timing.

6. The injection molding machine according to claim 5, wherein the flow passage cross-section changing processing unit reduces the cross-section of the flow passage by reducing a gap between the mating faces of the split mold through the increase of the mold clamping force.

* * * * *